United States Patent
Beaulieu et al.

(10) Patent No.: US 10,704,527 B2
(45) Date of Patent: Jul. 7, 2020

(54) APPARATUS AND METHOD FOR MODIFYING A GEOMETRY OF A TURBINE PART

(71) Applicant: Alstom Renewable Technologies, Grenoble (FR)

(72) Inventors: Sebastien Beaulieu, Vergheres (CA); Michel Sabourin, Sorel-Tracy (CA)

(73) Assignee: Alstom Renewable Technologies, Grenoble (FR)

( * ) Notice: Subject to any disclaimer, the term of this patent is extended or adjusted under 35 U.S.C. 154(b) by 433 days.

(21) Appl. No.: 15/503,116

(22) PCT Filed: Jul. 7, 2015

(86) PCT No.: PCT/EP2015/065494
§ 371 (c)(1),
(2) Date: Feb. 10, 2017

(87) PCT Pub. No.: WO2016/008772
PCT Pub. Date: Jan. 21, 2016

(65) Prior Publication Data
US 2017/0321649 A1    Nov. 9, 2017

Related U.S. Application Data

(60) Provisional application No. 62/024,622, filed on Jul. 15, 2014.

(30) Foreign Application Priority Data

Jul. 21, 2014   (CA) ..................................... 2857297

(51) Int. Cl.
*F03B 3/18*    (2006.01)
*B29C 70/74*   (2006.01)
(Continued)

(52) U.S. Cl.
CPC ............... *F03B 3/18* (2013.01); *B29C 39/18* (2013.01); *B29C 45/14* (2013.01); *B29C 70/745* (2013.01);
(Continued)

(58) Field of Classification Search
CPC ..................................................... B29C 39/18
See application file for complete search history.

(56) References Cited

U.S. PATENT DOCUMENTS 2,641,440 A * 6/1953 Williams ................ F01D 5/087
                                                              416/90 R
2,994,124 A * 8/1961 Denny ..................... B22F 7/04
                                                              428/557

(Continued)

FOREIGN PATENT DOCUMENTS

| FR | 2 992 887 A1 | 1/2014 |
| JP | 2008-261292 A | 10/2008 |
| JP | 2010-223074 A | 10/2010 |

OTHER PUBLICATIONS

Beaulieu S et al; "Breakthrough in the rehabilitation of stay vanes", Hydrovision, July 23-26, 2013, Colorado Convention Center, Denver, CO, USA,, Jul. 23, 2013 (Jul. 28, 2013), p. llpp, XP009185618, (Year: 2013).*

(Continued)

*Primary Examiner* — Woody A Lee, Jr.
*Assistant Examiner* — Brian Christopher Delrue
(74) *Attorney, Agent, or Firm* — Dority & Manning, P.A.

(57) ABSTRACT

An apparatus is provided for modifying the geometry of at least one part of a turbine, which can include a shell assembly that includes an outer shell that is shaped to modify the shape of a pre-existing element of a turbine. The outer shell of the shell assembly can be composed of a fiber-reinforced polymeric material and can at least partially define an inner cavity. The outer shell can be bonded to a
(Continued)

structure to modify the geometrical shape of that structure. Thereafter, a polymer casting can be injected into the inner cavity via at least one injection port attached to the shell assembly. In some embodiments, one or more stiffeners and/or a core can be positioned within the inner cavity to help improve the bonding of the polymer casting to the shell and/or improve a structural property of the apparatus.

11 Claims, 5 Drawing Sheets

(51) Int. Cl.
  B29C 39/18 (2006.01)
  B29C 45/14 (2006.01)
  B29K 105/20 (2006.01)
  B29L 31/00 (2006.01)
  F03B 3/02 (2006.01)

(52) U.S. Cl.
  CPC ... B29K 2105/20 (2013.01); B29L 2031/7504 (2013.01); F03B 3/02 (2013.01); F05B 2220/32 (2013.01); F05B 2230/21 (2013.01); F05B 2230/30 (2013.01); F05B 2230/80 (2013.01); F05B 2280/40 (2013.01); F05B 2280/4007 (2013.01); F05B 2280/6003 (2013.01); Y02E 10/223 (2013.01); Y02P 70/525 (2015.11)

(56) References Cited

U.S. PATENT DOCUMENTS

| | | | | |
|---|---|---|---|---|
| 3,271,004 A * | 9/1966 | Smuland | F01D 5/187 | 416/95 |
| 3,446,481 A * | 5/1969 | Kydd | F01D 5/08 | 416/92 |
| 3,773,506 A * | 11/1973 | Larker | B22F 5/04 | 419/49 |
| 3,856,433 A * | 12/1974 | Grondahl | F01D 5/081 | 416/97 R |
| 4,017,242 A * | 4/1977 | Mercer | B29C 45/2725 | 425/543 |
| 4,137,619 A * | 2/1979 | Beltran | B22F 5/04 | 29/889.722 |
| 4,156,582 A * | 5/1979 | Anderson | F01D 5/185 | 416/92 |
| 4,249,291 A * | 2/1981 | Grondahl | B23P 15/04 | 29/889.722 |
| 4,283,822 A * | 8/1981 | Muth | B23P 15/04 | 228/193 |
| 4,418,455 A * | 12/1983 | Cohn | B23P 15/04 | 164/112 |
| 4,529,372 A * | 7/1985 | Saumsiegle | B29C 43/36 | 425/145 |
| 4,755,690 A * | 7/1988 | Obermeyer | F03B 13/08 | 290/52 |
| 5,441,384 A | 8/1995 | Gokhman | | |
| 5,501,594 A * | 3/1996 | Glozer | B29C 45/278 | 264/328.15 |
| 5,820,899 A * | 10/1998 | Gellert | B29C 45/2735 | 425/549 |
| 6,287,080 B1 * | 9/2001 | Evans | B29C 39/10 | 415/200 |
| 6,431,850 B1 * | 8/2002 | Evans | B29C 70/44 | 425/390 |
| 6,454,536 B1 * | 9/2002 | Evans | B29C 39/10 | 416/224 |
| 6,884,507 B2 * | 4/2005 | Lin | C08G 18/10 | 428/402.21 |
| 6,926,494 B2 | 8/2005 | Sabourin | | |
| 6,941,720 B2 * | 9/2005 | DeFord | E04C 2/04 | 52/783.14 |
| 7,410,606 B2 * | 8/2008 | Appleby | B23P 15/246 | 264/219 |
| 8,539,659 B2 * | 9/2013 | Szela | B21K 3/04 | 29/402.13 |
| 8,672,617 B2 | 3/2014 | Couston et al. | | |
| 8,820,092 B2 * | 9/2014 | Thompson, Jr. | F01D 5/081 | 415/115 |
| 9,926,785 B2 * | 3/2018 | Stankowski | B23P 6/005 |  |
| 10,207,471 B2 * | 2/2019 | de Diego | C04B 35/76 |  |
| 10,260,349 B2 * | 4/2019 | Piraccini | F01D 5/147 |  |
| 10,358,929 B2 * | 7/2019 | McCaffrey | F01D 5/282 |  |
| 2002/0139082 A1 * | 10/2002 | DeFord | E04C 2/04 | 52/783.1 |
| 2003/0062145 A1 * | 4/2003 | Frasier | B22C 9/02 | 164/122.1 |
| 2003/0069321 A1 * | 4/2003 | Lin | C08G 18/10 | 521/159 |
| 2003/0089061 A1 * | 5/2003 | DeFord | E04C 2/04 | 52/309.9 |
| 2003/0128812 A1 * | 7/2003 | Appleby | B29C 33/3842 | 378/147 |
| 2003/0129061 A1 * | 7/2003 | Finn | B23P 15/04 | 416/224 |
| 2003/0146346 A1 * | 8/2003 | Chapman, Jr. | B64F 5/10 | 244/123.3 |
| 2004/0156709 A1 | 8/2004 | Nichtawitz et al. | | |
| 2004/0198852 A1 * | 10/2004 | Lin | C08G 18/10 | 521/54 |
| 2004/0231822 A1 * | 11/2004 | Frasier | B22D 47/00 | 164/122.2 |
| 2006/0168808 A1 * | 8/2006 | Lin | B23K 9/044 | 29/889.1 |
| 2007/0113999 A1 * | 5/2007 | Otero | B22C 9/04 | 164/28 |
| 2007/0157447 A1 * | 7/2007 | Prevey | B23P 6/002 | 29/402.01 |
| 2007/0298141 A1 * | 12/2007 | Barth | B29C 45/28 | 425/557 |
| 2008/0245928 A1 * | 10/2008 | Kulesha | B64C 3/187 | 244/123.1 |
| 2009/0139601 A1 * | 6/2009 | Karayianni | D02G 3/328 | 139/421 |
| 2011/0189440 A1 * | 8/2011 | Appleby | B22C 9/04 | 428/156 |
| 2012/0308397 A1 | 12/2012 | Sabourin et al. | | |
| 2013/0075025 A1 * | 3/2013 | Guitton | B29C 70/68 | 156/245 |
| 2013/0139494 A1 | 6/2013 | Prigent | | |
| 2013/0171426 A1 * | 7/2013 | de Diego | C04B 35/117 | 428/182 |
| 2014/0246141 A1 * | 9/2014 | Oldroyd | B29C 33/02 | 156/175 |
| 2015/0151485 A1 * | 6/2015 | Godon | B23P 15/04 | 264/261 |
| 2015/0276245 A1 * | 10/2015 | Walters | F24F 13/1486 | 454/259 |
| 2016/0160658 A1 * | 6/2016 | McCaffrey | F01D 5/282 | 415/200 |

OTHER PUBLICATIONS

Beaulieu, S., et al., "Breakthrough in the rehabilitation of stay vanes," Hydrovision Colorado Convention Center, pp. 1-11 (Jul. 23, 2013).

International Search Report and Written Opinion issued in connection with corresponding PCT Application No. PCT/EP2015/065494 dated Sep. 30, 2015.

International Preliminary Report on Patentability issued in connection with corresponding PCT Application No. PCT/EP2015/065494 dated Jan. 1, 2017.

* cited by examiner

APPARATUS AND METHOD FOR MODIFYING A GEOMETRY OF A TURBINE PART

TECHNICAL FIELD

The present disclosure relates to an apparatus and method for defining and/or modifying a geometry of at least one element of a turbine.

BACKGROUND

U.S. Pat. Nos. 8,672,617, 6,926,494 and 5,441,384 and U.S. Patent Application Publication Nos. 2004/0156709, 2012/0308397, and 2013/0139494 disclose examples of hydraulic turbines. Hydraulic turbines can be found to have a flow misalignment of water with stay vanes. Such misalignment can cause significant efficiency losses. Correction of such misalignment can often require substantial time and costs as solutions to such issues often require manipulation of heavy parts within confined space and/or dismantling of at least a portion of a turbine. Additionally, such factors can contribute to safety and handling issues that may need to be addressed for performing a correction to the flow misalignment of the stay vanes.

SUMMARY

According to aspects illustrated herein, there is provided an apparatus for modifying a geometry of at least one part of a turbine that includes a shell at least partially defining an inner cavity. The shell can comprise a composite material. The composite material can comprise fiber and a polymeric material. The apparatus can also include a polymer casting positioned within the inner cavity.

According to other aspects illustrated herein, a hydraulic turbine includes a stay ring, at least one stay vane attached to the stay ring, and a stay vane extension having a shell defining an inner cavity and a polymer casting positioned within the inner cavity. The stay vane extension can be attached to the stay vane.

According to other aspects illustrated herein a method of modifying a geometry of a part of a hydraulic turbine includes positioning an outer shell adjacent to a part of the hydraulic turbine. The outer shell can comprise a composite material that is comprised of a polymeric material. The method can also include the steps of attaching the outer shell to the part, and injecting a polymer casting into a space at least partially defined by the outer shell.

The above described and other features are exemplified by the following figures and detailed description.

BRIEF DESCRIPTION OF THE DRAWINGS

Referring now to the figures, which are exemplary embodiments, and wherein the like elements are numbered alike.

Other details, objects, and advantages of embodiments of the innovations disclosed herein will become apparent from the following description of exemplary embodiments and associated exemplary methods.

DETAILED DESCRIPTION

Disclosed herein is an apparatus and method for modifying the geometry of at least one part of a turbine. In some embodiments, the modification of the geometry of at least one part of the turbine can result in correcting for flow misalignment of fluid with stay vanes of the turbine. A turbine including such an apparatus is also disclosed herein. In some embodiments, the turbine can be a hydraulic turbine through which water is passed. The hydraulic turbine can be part of a hydroelectric turbine installation. It is also contemplated that other embodiments of the turbine could be configured for a fluid to be passed therethrough that includes liquid water and/or other fluid.

Some embodiments of the hydraulic turbine can be designed as a Francis turbine. For such embodiments, the turbine can include a runner wheel that turns in the center of a spiral case. A stay ring 2 with spaced apart stay vanes 1 can be positioned at the outlet of the spiral case. The stay vanes 1 can be configured to support the weight of the turbine when the turbine is not in operation and to support the pressure conditions that can exist in the spiral case when the turbine operates. The stay vanes can be aligned with the fluid flow of liquid water to help ensure efficient operation of the turbine by being sized and configured to minimize hydraulic losses. A radial distributor with wicket gates behind the stay vanes 1 can orient the water flow at the runner entrance. Water can be passed through the runner and follow its course in a draft tube. The stay vanes may have a height that extends from the lower side 2b of the stay ring to an upper side 2a of the stay ring 2 and each stay vane may also have a length that extends from a trailing edge 1b of the stay vane 1 to a leading edge 1a of the stay vane 1.

Referring to FIGS. 1-6, an apparatus for modifying the geometry of at least one part of a turbine can be configured for correcting a misalignment of fluid flow with stay vanes of a turbine. In some embodiments, the apparatus can be provided for attachment to one or more existing stay vanes of a turbine of a pre-existing turbine installation. For instance, the apparatus can be configured as a stay vane extension that is composed of a composite shell assembly 3 that can be bonded to a stay vane 1 of a pre-existing turbine installation. The volume contained between the bonded stay vane extension shell assembly 3 and the stay vane 1 can be filled with a polymer casting 12. The volume that is filled with the polymer casting can be the volume of an inner cavity or other space that is at least partially defined by the outer shell 8 of the shell assembly 3. The volume can also be defined by portions of the stay ring 2 and the stay vane 1 to which the outer shell 8 is attachable. A polymer casting can be positioned within the volume defined by the stay ring 2, stay vane 1, and outer shell 8 to link the shell to the stay ring 2 and stay vane 1 to modify the geometry of the stay vane 1 via the structure of the outer shell 8.

The shell assembly 3 can include an outer shell 8 that can define the hydraulic profile of the stay vane extension. In some embodiments, the outer shell 8 can be made of a fiber and polymer composite layup (e.g. a carbon fiber reinforced polymeric material, a carbon-fiber-reinforced plastic material, a carbon-fiber reinforced thermoplastic material, a material composed of pre-preg material, a glass fiber reinforced polymeric material, etc.). The upper edge 6 and lower edge 4 of the outer shell 8 of the shell assembly 3 can be trimmed to match as much as possible the upper and lower surface of the stay ring 2. The structure of the outer shell 8 can be configured to have a variable thickness so that a thickness of a portion 13 of the shell adjacent the bonded interface 14 between the shell assembly 3 and the stay vane 1 is decreased as compared to other portions of the shell. The portion 13 of the outer shell having the decreased thickness can be tapered to continuously decrease in thickness from a first thickness to a second thickness that is narrower than the first thickness. The portion 13 of the shell having the decreased thickness can be configured to decrease the rigidity of the shell in this area to optimize the match of the shell assembly 3 with the geometry of the stay vane 1. The portion 13 of the outer shell having the decreased thickness can help ensure a smooth transition between the pre-existing stay vane outer structural profile and the outer profile of the outer shell being attached to the stay vane 1 to modify the geometry of the stay vane 1. The smooth transition can result in the outer shell 8 of the shell assembly that contacts the stay vane at the bonding interface to smoothly mate with the stay vane such that the shell continuously extends from the bonded interface 14.

Figure 5:
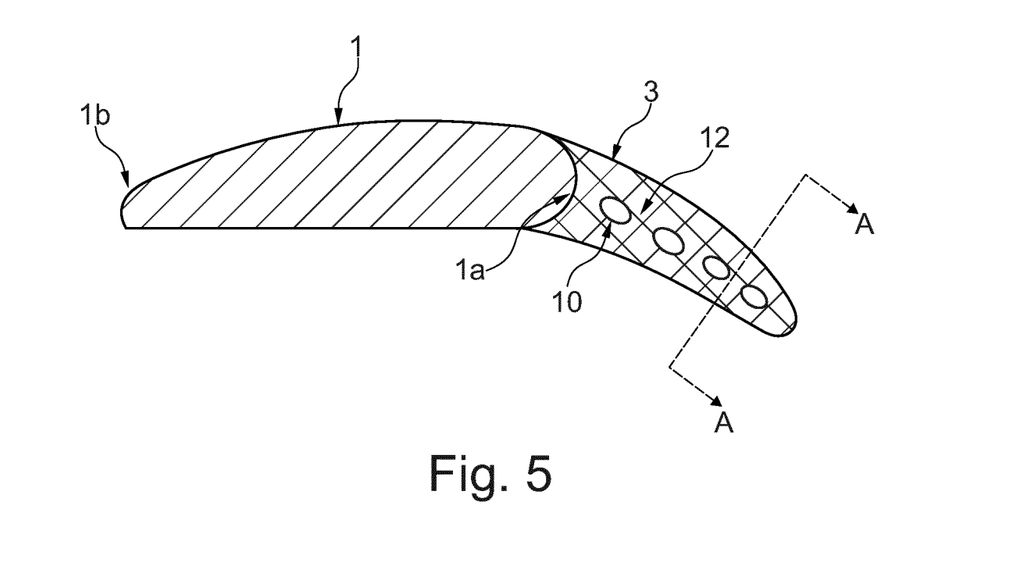
FIG. 5 is a cross sectional view of the first exemplary embodiment of the apparatus for modifying the geometry of at least one part of a turbine.
Figure 6:
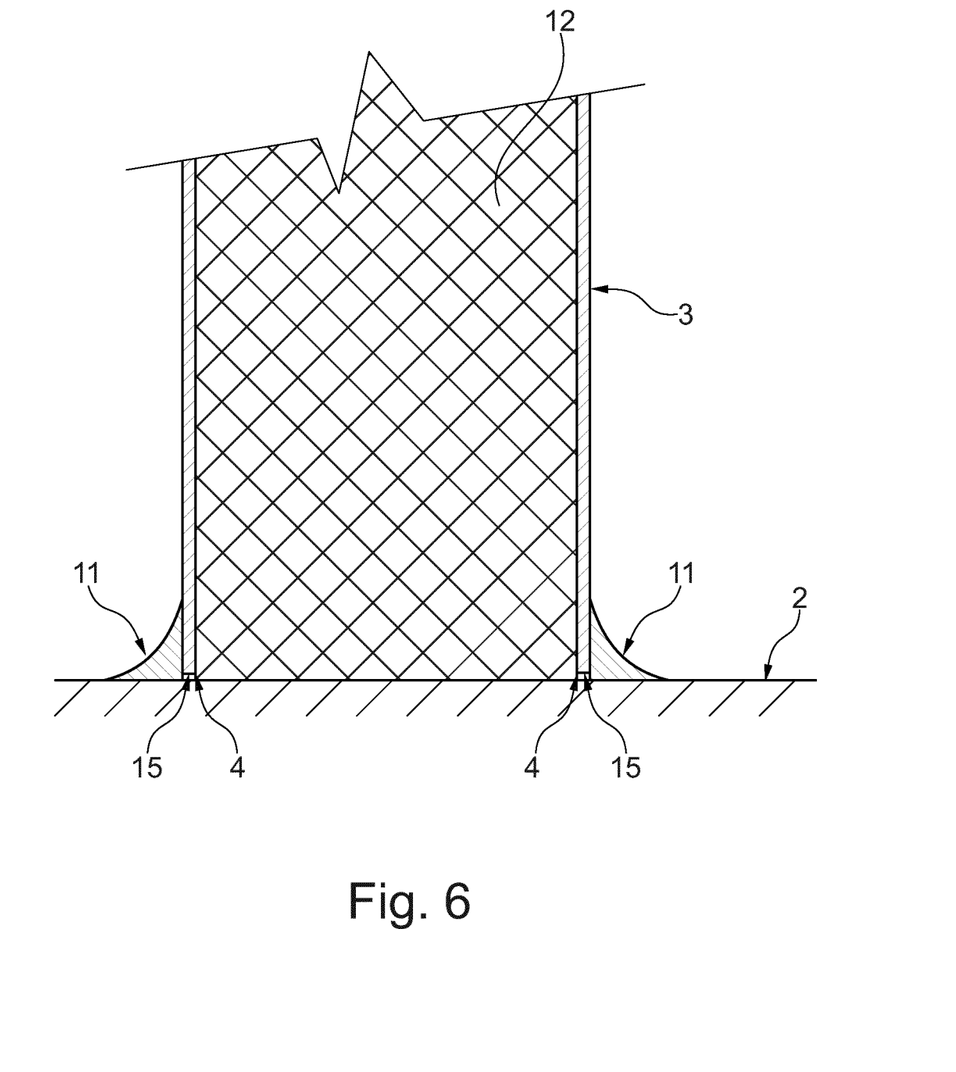
FIG. 6 is a cross sectional view of the first exemplary embodiment of the apparatus for modifying the geometry of at least one part of a turbine taken along line A-A of FIG. 5.

For example, the portion 13 of the outer shell 8 having the decreased thickness can be configured so that portions of two opposing faces of the outer shell adjacent a first side 5 of the outer shell 8 are spaced apart from each other to define a portion of a cavity within the outer shell 8. The two opposing sides of the outer shell 8 that define the portions of these faces can define the portion 13 and can each be structured as a portion of a wall or other shell element that decreases in thickness from a middle portion of that side of the outer shell 8 to a distal end of the first side 5 of the outer shell 8 such that the distal end of the first side 5 of the outer shell on each face of the outer shell is defined by a wall having a thinner thickness than the portion of the wall that is farther from the distal end of the first side 5 of the outer shell. The distal end of the first side 5 of the outer shell 8 can be directly bonded to the stay vane 1 such that distal ends of both of the opposing faces of the outer shell that comprise the portion 13 of the outer shell 8 having the decreased thickness is bonded to the stay vane on opposite sides of the stay vane 1 in the region of the bonded interface 14. The portion of the cavity defined between the opposing sides of the portion 13 at the distal end of the portions can have a thickness that is equal to or is substantially equal to the width or thickness of the portion of the stay vane 1 to which it is attached (e.g. is exactly the same width as the stay vane, is within 5% of the width of the portion of the stay vane to which the portion 13 is attached to the stay vane 1, etc.).

Figure 3:
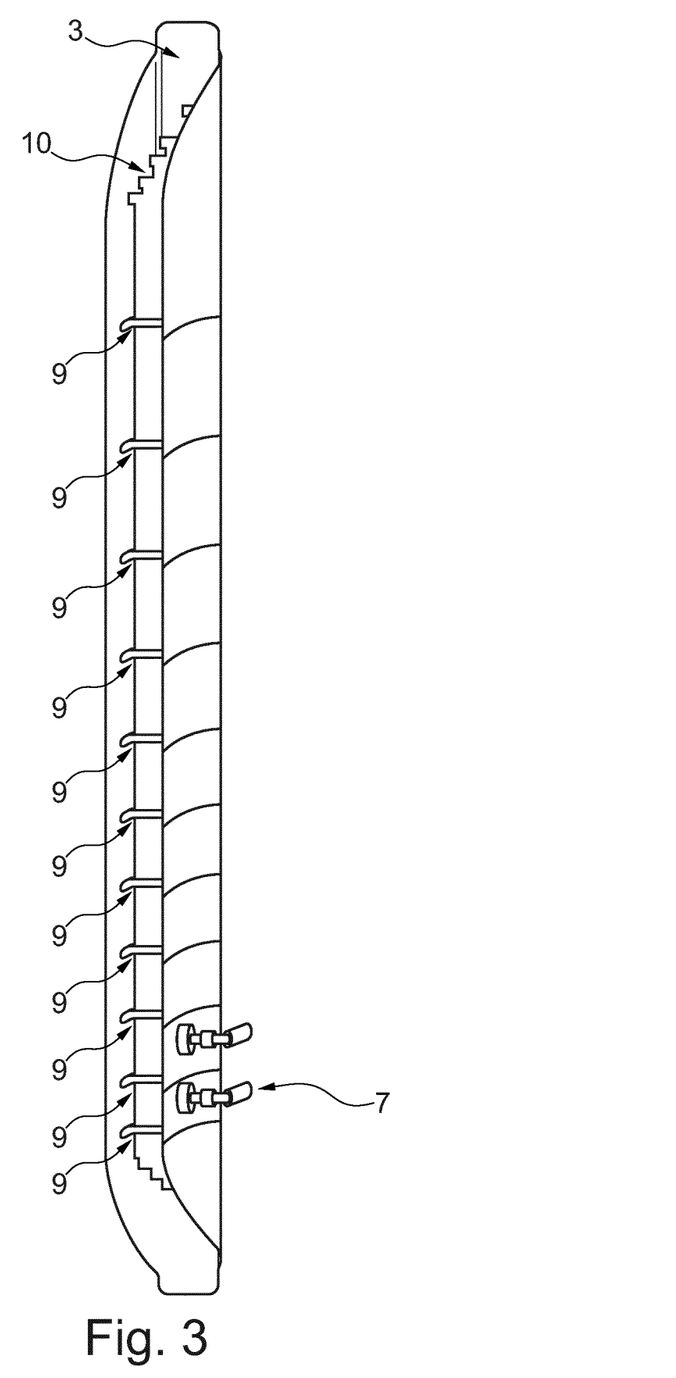
FIG. 3 is a perspective view of an exemplary embodiment of a shell assembly of the first exemplary embodiment of the apparatus shown in FIG. 1. The view of the outer shell of the shell assembly is from an open end of the outer shell to illustrate the core and/or stiffener elements that can be positionable within a cavity at least partially defined by the outer shell of the shell assembly.

Stiffeners 9 can be assembled or otherwise positioned within an inner cavity defined by the outer shell of the shell assembly 3. The stiffeners 9 can be positioned within the shell assembly 3 to increase the stiffness of the shell assembly 3 and avoid deformation of the outer shell 8 that could occur due to hydrostatic pressure that may occur during the injection of a polymer casting 12 within an inner cavity at least partially defined by the outer shell 8. The stiffeners 9 can be stiffening elements that are positioned within the inner cavity defined by the outer shell of the shell assembly. Each of the stiffener elements can be an element such as an elongated filament, an elongated metallic member, a tube, an elongated rigid member, or other element that can help support the hydrostatic pressure due to the presence of uncured polymer casting injected into an inner cavity of the outer shell 8.

Figure 1:
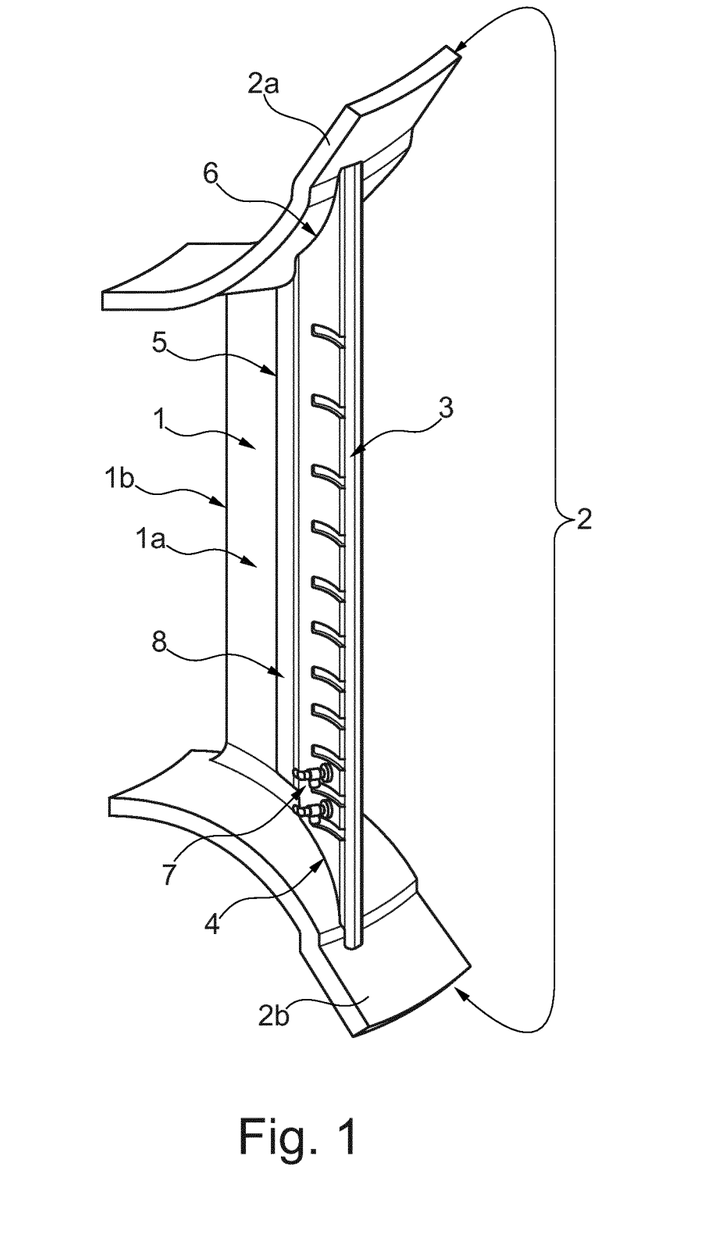
FIG. 1 is an isometric view of a first exemplary embodiment of an apparatus for modifying the geometry of at least one part of a turbine that is utilizable in embodiments of a turbine.
Figure 2:
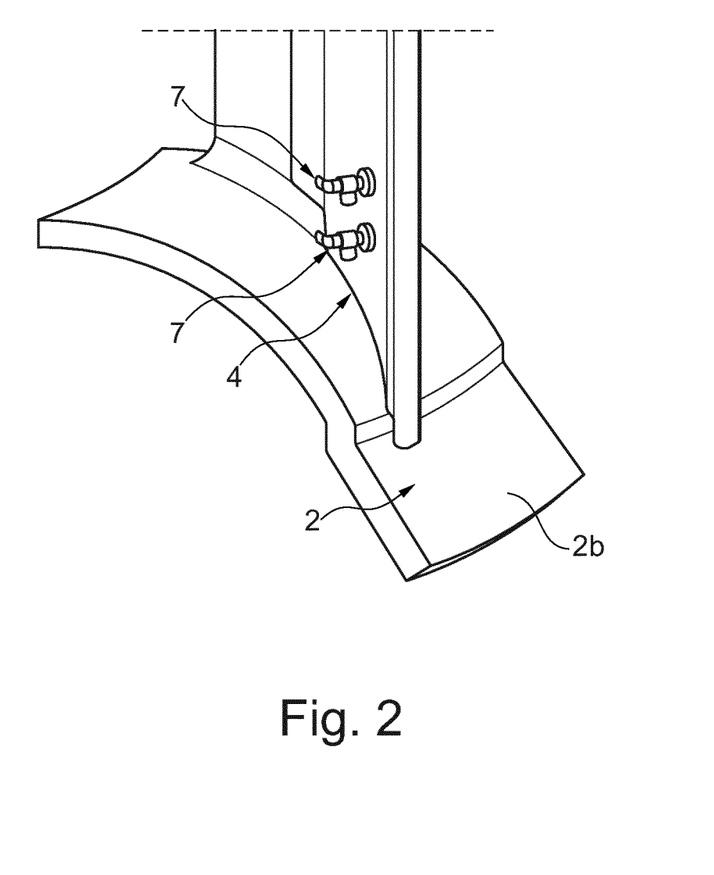
FIG. 2 is an enlarged fragmentary view of the lower end of the first exemplary embodiment of the apparatus shown in FIG. 1.

The shell assembly 3 can also include one or more injection ports 7 that are sized and configured for the injection of the polymer casting 12. In some embodiments, multiple injection ports 7 can be positioned on a same face of the shell adjacent the bottom of the outer shell of the shell assembly 3. In other embodiments, the injection ports 7 can be on opposite sides of the outer shell 8 or opposite faces of the outer shell 8 (e.g. at least one port at adjacent a top of the shell and another port adjacent a bottom of the shell, and/or at least one port on a first face of the shell and a second port on the opposite second face of the shell). Each port 7 can be connected to a valve or otherwise be equipped with a valve. Each valve can be configured to control a flow of the polymer casting into the inner cavity of the shell assembly defined by the outer shell. For instance, each valve can be actuated to adjust a position of the valve to adjust the flow of the polymer casting being injected into the interior cavity that is at least partially defined by the outer shell.

A core 10 can also be inserted into the stay vane extension. The core 10 can be composed of an array of closed end pipes supported by the stiffeners. The core 10 could alternatively be composed of a plurality of elongated members or elongated hollow members that are arranged within the inner cavity at least partially defined by the outer shell of the shell assembly 3. The hollow members can be, for example, tubes, shafts, poles, elongated polygonal shaped members, or other elements that have at least one hollow inner section (e.g. a continuous hollow cavity within the member or a plurality of hollow cavities defined within the member). The core 10 can be configured to increase the surface to volume ratio within the shell assembly to control the exothermal reaction that can take place during the polymerization of the polymer casting 12 that occurs after the polymer casting 12 is injected into the inner cavity of the shell assembly. The core 10 can also help control the temperature of the polymer casting within the outer shell as the injected polymer casting 12 cures within the outer shell 8.

In some embodiments, a fluid can be circulated through the hollow members of the core 10 to help facilitate the cooling of the polymer casting during its polymerization. For example, liquid water, air, a refrigerant, or other type of cooling fluid having a temperature that is lower than the temperature of the injected polymer casting during the polymerization process that could be passed through the hollow members of the core 10 to facilitate cooling and curing of the polymeric casting after the polymeric casting is injected into the outer shell 8. For instance, at least one conduit can connect the source of the cooling fluid to one or more hollow members of the core 10 and a pump or fan can be in communication with the source to drive motion of the fluid through the hollow members while the polymer casting 12 is curing within the outer shell 8.

Figure 4:
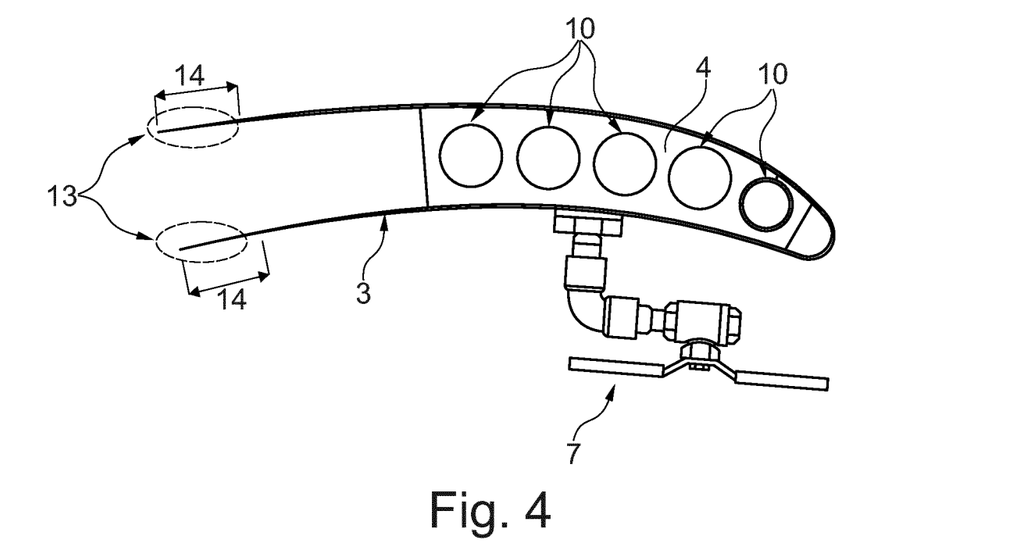
FIG. 4 is a top view of the shell assembly of the first exemplary embodiment of the apparatus for modifying the geometry of at least one part of a turbine.

A first side 5 of the outer shell of the shell assembly can be structured to define an opening that extends from adjacent the upper edge 6 of the shell assembly 3 to the lower edge 4 of the outer shell of the shell assembly 3. The opening can be in communication with the inner cavity that is at least partially defined by the outer shell and can be structured to facilitate a bonding with the stay vane 1. A second side opposite the first side 5 of the outer shell can be shaped to enclose the inner cavity at least partially defined by the outer shell and facilitate a desired fluid flow motion for water or other fluid that may pass along the shell assembly.

The core 10 and/or stiffeners 9 can be positioned within at least one cavity defined by the outer shell 8 prior to the outer shell 8 being positioned adjacent to a stay vane or other part of a turbine for attachment to that stay vane or other part of the turbine. For instance, the outer shell 8 can be assembled in a shop or other facility to have a general structure that defines a cavity therein that is in communication with a mouth or other opening adjacent the first side 5 of the outer shell 8. The core 10 and/or stiffeners 9 can be positioned within the cavity and bonded and/or mechanically attached to the outer shell 8 while the shell is being fabricated in the shop or other facility. Thereafter, the shell assembly having the core 10 and/or stiffeners can be shipped or otherwise transported to a turbine site for installation onto a part of a pre-existing turbine or for installation into a turbine to be newly installed at a site. After the outer shell is positioned adjacent to the one or more parts to which the shell is to be attached and is trimmed, if necessary, to match the geometry of the stay vane 1, stay ring 2, or other part to which the shell is to be attached, the outer surface of the outer shell and/or surfaces to which the outer shell is to be bonded may undergo surface preparation via sand blasting or other surface preparation mechanism.

After the outer shell 8 of the shell assembly 3 is formed, undergoes surface preparation, and has any stiffeners 9 and/or core 10 positioned within the inner cavity of the outer shell of the shell assembly, the shell assembly 3 can be bonded to the stay vane 1 at the bonded interface 14. The bonding can be formed by use of one or more adhesives positioned on the extremity of the first side 5 of the outer shell 8 (e.g. distal ends of opposing walls of the outer shell that are spaced apart to define the inner cavity) for contacting with the stay vane 1 for bonding the stay vane 1 to the first side 5 of the outer shell of the shell assembly 3. A force or pressure can also be applied by clamping or other mechanism to help press the first side 5 of the outer shell 8 toward the leading edge of the stay vane 1 while the adhesive cures to help facilitate the bonding of the first side 5 of the outer shell to opposing outer sides of the stay vane 1. The opposing outer sides of the stay vane 1 to which the first side 5 of the outer shell 8 is attached can be adjacent to a leading edge of the stay vane 1 in some embodiments.

A putty 11 can also be utilized to seal any gap that may exist between the outer shell 8 and the stay ring 2. The putty 11 can be applied prior to the polymer casting 12 being injected into the outer shell 8 for bonding the outer shell 8 to the stay vane 1 and the stay ring 2. For instance, a putty 11 can be positioned at opposite sides of the upper edge 6 and lower edge 4 of the outer shell 8 to close gaps 15 that may exist between the upper and lower edges of the outer shell 8 and the stay ring 2. The putty can extend from the first side 5 of the outer shell to its opposite second side of the outer shell along both the first and second faces of the shell for contact with the stay ring adjacent the lower and upper edges of the shell. For example, the putty 11 can be positioned on opposite sides of the outer shell 8 continuously along the length of the sides of the outer shell that extend from adjacent the leading edge of the stay vane to adjacent a distal opposite end of the outer shell 8. The putty 11 can be radiused, rounded, or otherwise shaped to blend the edges of the outer shell 8 and the stay ring at the bonded interface between the shell and the stay ring 2 at the lower and upper edges of the stay ring 2 to define a smooth radius between the outer shell 3 and the upper and lower surfaces of the stay ring 2. FIG. 6 may best illustrate an example of such a shaping to the putty 11 as well as the gap 15 between the outer shell lower end 4 and the stay ring 2 that is sealed by the putty 11.

After the adhesive at the bonded interface 14 between the first side 5 of the shell and the stay vane 1 is cured and the putty 11 is cured, the polymer casting 12 can be injected inside the cavity that is at least partially defined by the outer shell. The portion of the stay ring 2 above the upper edge 6 and below the lower edge 4 of the shell as well as the stay vane adjacent the first side 5 of the shell can be positioned so that the inner cavity of the outer shell 8 in which the polymer casting 12 is to be injected is enclosed by the outer shell 8, the stay ring 2, and the stay vane 1. The polymer casting can include a polymeric material. For example, the polymer casting can include a thermoset polymer resin mixed with a curing agent that is in a liquid state or other fluid state for injecting into the cavity. It is also contemplated that the polymer casting 12 can alternatively include a thermoplastic resin mixed with a curing agent that is in a liquid or other fluid form for injecting into the cavity.

The injected polymer casting 12 can increase the resistance to impact loading of the stay vane extension defined by the shell assembly 3 and can also chemically link the shell assembly 3 to the stay vane 1. The polymer casting 12 can also chemically link the shell assembly 3 to the stay ring 2 adjacent the lower and upper edges of the outer shell of the shell assembly. After the injected polymer casting is cured, the injection ports 7 can be trimmed so that the face (or faces) of the shell having the injection ports has a desired geometry and/or surface profile.

The polymer casting 12 can be injected by connecting a source of the polymer casting to one or more of the ports 7. Such a connection can include, for example, a conduit connected between the source of the polymer casting to be injected and one or more ports 7 that are in communication with the inner cavity at least partially defined by the outer shell 8 of the shell assembly 3. The conduit may include at least one tube, pipe, duct, a flexible tube, a flexible hose, or other conduit element. A pump, fan, or other flow driving mechanism can be fluidly connected to the source of the polymer casting material and actuated to drive the injection of the polymer casting 12 into the cavity at least partially defined by the outer shell 8 via the one or more ports 7. Each port 7 can be attached to a valve or be otherwise equipped with a valve that may be manipulated to help adjust a flow rate of the polymer casting 12 being injected into the cavity during the injection of the polymer casting.

Embodiments of the apparatus can be configured for correcting a misalignment of fluid flow with stay vanes of a turbine and can be configured to be formed on pre-existing stay vanes of a hydroturbine or other type of hydraulic turbine to correct for flow misalignment of the stay vanes of that turbine. The formed apparatuses for correcting the misalignment of fluid flow with the stay vanes can permit the correction of the flow misalignment to occur without use of large, heavy parts that can be difficult to maneuver and/or handle within the spiral casing of a turbine as embodiments of the apparatus for correcting a misalignment of fluid flow can be of a substantially lower weight than heavy metal components. The reduced weight can also reduce safety issues related to installation and/or fabrication as embodiments of the apparatus for correcting a misalignment of fluid flow. Embodiments of the apparatus for correcting a misalignment of fluid flow can be configured for installation onto a pre-existing stay vane 1 without the use of a specific handling device to be designed and installed for the installation of a stay vane extension or other type of apparatus for correcting a misalignment of fluid flow.

Embodiments of the apparatus and method for modifying the geometry of at least one part of a turbine can also be configured for attachment to other types of structures of a turbine to modify other structure that may be within a pre-existing turbine installation. For instance, embodiments of the apparatus could be configured for attachment to wicket gates or other elements of a turbine for adjusting a shape of such a structure or repairing such a structure. Such a shaped apparatus can include a shell assembly that has an outer shell 8 that at least partially defines an inner cavity. The outer shell 8 can be composed of a composite material comprising fiber and polymeric material. The shell assembly can also include a polymer casting that is within the inner cavity. The polymer casting can be positioned in the inner cavity via injection of the polymer casting into the inner cavity via one or more ports 7 attached to the outer shell that is in fluid communication with the inner cavity. A core 10 can be positioned within the inner cavity and a plurality of stiffeners 9 can also be positioned within the inner cavity at least partially defined by the shell.

It should also be understood that embodiments of the apparatus for modifying the geometry of at least one part of a turbine could be configured for attachment to a turbine during installation of a turbine and/or during fabrication of a component of the turbine and/or for retrofitting into a pre-existing turbine installation. For instance, an outer shell 8 can be positioned adjacent to a first part of a hydraulic turbine where the outer shell 8 is comprised of a composite material comprising at least one of fiber and polymeric material. The outer shell can then be attached to that first part, and the polymer casting 12 can subsequently be injected into a space at least partially defined by the outer shell and the part. A core 10 and/or stiffeners 9 can be positioned within the space at least partially defined within the outer shell prior to the polymer casting being injected into the space. The polymer casting can be injected into the space via one or more ports 7. A putty 11 can also be utilized to seal gaps that can be formed between the outer shell 8 and a second part of the hydraulic turbine that is adjacent to the outer shell 8, such as a stay ring 2 or other turbine component. The polymer casting 12 can be injected after the outer shell 8 is attached to the first and second parts by an adhesive, another type of bonding agent and/or combinations thereof and after gaps between the outer shell and any part to which the outer shell is to be attached is sealed via putty 11 or other type of gap sealing mechanism.

Embodiments of the apparatus for modifying the geometry of at least one part of a turbine can also be configured to avoid problems that can arise from the use of welding of metals as well as other problematic variables that result from use of structures composed only of metal or having an outer surface composed primarily of metal. For instance, no welding is needed for attachment of embodiments of the apparatus for modifying the geometry of at least one part of a turbine. The non-use of welding permits the installation of the embodiments of the apparatus for modifying the geometry of at least one part of a turbine to occur without dismantling of portions of a turbine to avoid heat from welding deforming critical surfaces or otherwise damaging the turbine. Further, non-use of rigid metal structures on an exterior surface of a structure can help prevent problems associated with adjusting a formed metal profile to match the profile of a pre-existing stay vane and/or stay ring. Such adjustment of a rigid metal structure can require complicated operations that results in removal of material to shape a formed structure or addition of material to shape the formed structure to match with the pre-existing stay vane and stay ring structures. Such complication and cost can be avoided by embodiments of the apparatus for correcting a misalignment of fluid flow.

It should be appreciated that various changes can be made to embodiments of the apparatus for modifying the geometry of at least one part of a turbine and methods of making and using the same to account for different design criteria. For example, the fiber that reinforces the polymeric material of the outer shell 8 of the vane extension shell assembly 3 can be composed of glass, carbon, carbon nanotubes, aluminum, aramid, and/or other type of fiber and/or combinations of such fiber. Additionally, the polymeric material that the fiber reinforces can be any polymeric material that is suitable for a particular set of design criteria, such as a thermoplastic polymeric material (e.g. polyester, vinyl ester, nylon, etc.) or a thermoset polymeric material (e.g. epoxy, etc.). As yet another example, the polymer casting can be any type of suitable polymer casting (e.g. epoxy based casting, polyurethane based casting, a thermosetting resin mixed with a curing agent, etc.) that meets a particular set of design criteria. As yet another example, the type of bonding agent utilized for attachment of the apparatus to the part can be any suitable bonding agent and/or combination of bonding agents.

While the invention has been described with reference to various exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for modifying a geometry of a stay vane of a turbine, the apparatus comprising:
   a shell assembly at least partially defining an inner cavity, the shell assembly comprising a composite material, the composite material comprising fiber and a polymeric material, the shell assembly further comprising a plurality of stiffeners positioned within the inner cavity;
   a polymer casting positioned within the inner cavity; and
   a core positioned within the inner cavity, the core comprising a plurality of hollow members for circulating a fluid therethrough to help facilitate cooling of the polymer casting, the shell assembly further comprising at least one injection port for injection of the polymer casting into the inner cavity, the plurality of stiffeners configured to stiffen the shell assembly during injection of the polymer casting.

2. The apparatus of claim 1, wherein the shell assembly has a first side defining an opening that is in communication with the inner cavity and wherein the first side of the shell assembly is configured for attachment to opposing sides of the stay vane of the turbine.

3. A hydraulic turbine, comprising:
a stay ring;
at least one stay vane attached to the stay ring; and
a stay vane extension having a shell assembly defining an inner cavity, a polymer casting positioned within the inner cavity, and a core positioned within the inner cavity, the core comprising a plurality of hollow members for circulating a fluid therethrough to help facilitate cooling of the polymer casting, the stay vane extension being attached to the at least one stay vane, the shell assembly further comprising a plurality of stiffeners positioned within the inner cavity and at least one injection port for injection of the polymer casting into the inner cavity, the plurality of stiffeners configured to stiffen the shell assembly during injection of the polymer casting.

4. The turbine of claim 3, wherein the shell assembly is comprised of a composite material comprising fiber and polymeric material.

5. A method of modifying a geometry of a part of a hydraulic turbine, comprising:
positioning an outer shell adjacent to a part of the hydraulic turbine, the outer shell comprising a composite material, the composite material comprising polymeric material, the outer shell further comprising a core positioned within an inner cavity thereof, the core further comprising a plurality of stiffeners and a plurality of hollow members;
attaching the outer shell to the part;
injecting a polymer casting into an injection port on the outer shell in fluid communication with the plurality of hollow members of the core of the inner cavity, the plurality of stiffeners configured to stiffen the shell assembly during injection of the polymer casting; and
circulating a fluid through the plurality of hollow members to help facilitate cooling of the polymer casting.

6. The method of claim 5, wherein the part is a stay vane and the turbine also has a stay ring to which the stay vane is attached, the method comprising:
sealing gaps defined between upper and lower edges of the outer shell and the stay ring.

7. The method of claim 6, wherein the injecting of the polymer casting into the inner cavity is performed after the sealing of the gaps is performed.

8. The method of claim 7, wherein the inner cavity is defined by the outer shell, the stay vane, and the stay ring.

9. The method of claim 8, comprising:
positioning at least one of the core and the plurality of stiffeners into the inner cavity prior to the injecting of the polymer casting into the inner cavity.

10. The method of claim 9, wherein the composite material is also comprised of fiber.

11. The method of claim 5, comprising:
adjusting a valve attached to the injection port to control a flow of the polymer casting being injected into the inner cavity; and
trimming the injection port from the outer shell after the polymer casting is injected into the inner cavity.

* * * * *